(12) United States Patent
Nishi et al.

(10) Patent No.: US 7,930,084 B2
(45) Date of Patent: Apr. 19, 2011

(54) ENGINE SPEED CONTROL SYSTEM FOR WORK VEHICLE

(75) Inventors: Eiji Nishi, Kawachinagano (JP); Nobuyuki Okabe, Izumi (JP); Kenji Yoshikawa, Osaka (JP)

(73) Assignee: Kubota Corporation, Osaka (JP)

( * ) Notice: Subject to any disclaimer, the term of this patent is extended or adjusted under 35 U.S.C. 154(b) by 405 days.

(21) Appl. No.: 12/212,325

(22) Filed: Sep. 17, 2008

(65) Prior Publication Data
US 2009/0299613 A1    Dec. 3, 2009

(30) Foreign Application Priority Data

May 29, 2008  (JP) ................. 2008-141216
May 29, 2008  (JP) ................. 2008-141217

(51) Int. Cl.
*G06F 7/70*  (2006.01)
*F02D 41/08* (2006.01)

(52) U.S. Cl. ........................................ 701/50

(58) Field of Classification Search ............. 701/50, 701/101, 110; 123/350, 399; 172/2
See application file for complete search history.

(56) References Cited

FOREIGN PATENT DOCUMENTS

JP    01-195933    8/1989

*Primary Examiner* — Mahmoud Gimie
(74) *Attorney, Agent, or Firm* — The Webb Law Firm

(57) ABSTRACT

The engine speed control system for a work vehicle has a foot accelerator controller for carrying out foot accelerator control based on a pedal sensor, a hand accelerator controller for carrying out hand accelerator control based on a lever sensor, a manually operated input device, storage means for storing a predetermined engine speed, and a constant rotation controller for carrying out constant rotation control in which the engine speed stored in the storage means is used as the target rotational speed on the basis of an input to the input device. The constant rotation control is carried out when the input device has been operated in the case that the engine speed that corresponds to the output of the lever sensor is greater than an idling speed, and the constant rotation control is terminated when the input device is operated in the case that the engine speed that corresponds to the output of the lever sensor is equal to or less than the idling speed.

12 Claims, 5 Drawing Sheets

ENGINE SPEED CONTROL SYSTEM FOR WORK VEHICLE

BACKGROUND OF THE INVENTION

1. Field of the Invention

The present invention relates to an engine speed control system for a work vehicle having a function for carrying out foot accelerator control in which an engine speed that corresponds to an output of the pedal sensor is used as a target rotational speed, a function for carrying out hand accelerator control in which the engine speed that corresponds to the output of a lever sensor is used as the target rotational speed, and a function for carrying out constant rotation control in which the engine speed stored in advance is used as the target rotational speed on the basis of an input to a manually operated input device.

2. Description of the Related Art

A system for carrying out constant rotation control with priority given to hand accelerator control by switching on a switch as an input device is disclosed in Japanese Patent No. 1-195933 as an engine speed control system for a work vehicle as described above. In this system, when the input device is operated, constant rotation control is carried out with priority given to hand accelerator control in accompaniment with the operation in a stopped vehicle state in which power transmission from the engine is cut off and the accelerator lever is positioned in an idling position. The output speed of the engine thereby increases to an engine speed stored in advance. In other words, the output speed of the engine increases unnecessarily by operating the input device in spite of the fact that the vehicle is at a stop.

SUMMARY OF THE INVENTION

An object of the present invention is to provide an engine speed control system for a work vehicle in which an unnecessary increase in the output speed of the engine due to the operation of the input device is avoided in a stopped vehicle state in which the accelerator lever is positioned in the idling position.

In order to achieve the objects described above, the engine speed control system for a work vehicle according to the present invention comprises: a pedal sensor for detecting an operative position of an accelerator pedal; a foot accelerator controller for carrying out foot accelerator control in which the engine speed that corresponds to an output of the pedal sensor is used as a target rotational speed; a lever sensor for detecting the operative position of an accelerator lever; a hand accelerator controller for carrying out hand accelerator control in which the engine speed that corresponds to an output of the lever sensor is used as the target rotational speed; a manually operated input device; storage means for storing a predetermined engine speed; and a constant rotation controller for carrying out constant rotation control in which the engine speed stored in the storage means is used as the target rotational speed on the basis of an input to the input device. Furthermore, the constant rotation control is carried out when the input device has been operated in the case that the engine speed that corresponds to the output of the lever sensor is greater than an idling speed; and the constant rotation control is terminated when the input device is operated in the case that the engine speed that corresponds to the output of the lever sensor is equal to or less than the idling speed.

In accordance with this aspect, constant rotation control based on the operation of the input device is carried out only when the accelerator lever is moved to an operative position in which the output speed of the engine is greater than the idling speed. Execution of constant rotation control can thereby be avoided even when the input device has been operated in a stopped vehicle state in which power transmission from the engine is cut off and the accelerator lever is positioned in an idling position. Therefore, an unnecessary increase in the output speed of the engine is prevented because execution of constant rotation control is avoided even when the input device has been operated in a stopped vehicle state in which the accelerator lever is positioned in the idling position.

In one preferred embodiment of the embodiment, the constant rotation control being carried out is terminated and accelerator control having a higher target engine speed among the foot accelerator control and the hand accelerator control is carried out on the basis of the operation of the input device when the operation is carried out during execution of the constant rotation control.

In accordance with this aspect, an input device can be used to easily switch the travel state of the vehicle body between a constant speed state (referred to hereinafter as "stored constant speed state") in which the target engine speed (hereinafter referred to as "stored rotational speed") stored in the storage means is used as an output speed of the engine, and a constant speed state (referred to hereinafter as "lever constant speed state") in which the target engine speed (hereinafter referred to as "lever-set rotational speed") that corresponds to the output of the lever sensor is used as an output speed of the engine.

In the lever constant speed state, the accelerator pedal is operated so that the engine speed (hereinafter referred to as "Pedal-set rotational speed") that corresponds to the output of the pedal sensor is higher than the lever-set rotational speed, whereby the vehicle body can be made to travel in a pedal acceleration state in which the output speed of the engine is increased from the lever-set rotational speed to the pedal-set rotational speed during the interval in which the accelerator pedal is being operated. It is possible to easily return to a lever constant speed state by cancelling the operation of the accelerator pedal in the pedal acceleration state.

The constant speed state for work and the constant speed for headland turning can be easily achieved by operating the input device by using the lever constant speed state for work and using the stored constant speed state for headland turning. In the constant speed state for work, the pedal acceleration state produced by operating the accelerator pedal can be easily created as necessary. Therefore, switching between the constant speed state for work and the constant speed state for headland turning can be carried out in a simple manner, and transition from the lever constant speed state to the pedal acceleration state can be easily performed as required.

In another preferred embodiment of the present invention, the foot accelerator control is carried out with priority given to the constant rotation control when the engine speed that corresponds to the output of the pedal sensor during execution of the constant rotation control is greater than the engine speed stored in the storage means; and the foot accelerator control is terminated and the constant rotation control is resumed when the engine speed that corresponds to the output of the pedal sensor is less than the engine speed stored in the storage means during priority execution of the foot accelerator control.

In accordance with this aspect, the accelerator pedal is operated so that the pedal-set rotational speed is greater than the stored rotational speed in the stored constant speed state, whereby the vehicle body can be made to travel in a pedal acceleration state in which the output speed of the engine is increased from the stored rotational speed to the pedal-set rotational speed during the interval in which the accelerator pedal is being operated. It is possible to easily return to the stored constant speed state by cancelling the operation of the accelerator pedal in the pedal acceleration state. Therefore, in the stored constant speed state, the pedal acceleration state produced by operating the accelerator pedal can be easily created as necessary.

In another preferred embodiment of the present invention, the constant rotation control is terminated and accelerator control having a higher target engine speed among the foot accelerator control and the hand accelerator control is carried out in the case that the accelerator lever operation is detected in the direction in which the target engine speed is reduced during execution of the constant rotation control, and that the target engine speed based on the accelerator lever operation is less than the engine speed stored in the storage means.

In accordance with this aspect, in the stored constant speed state, the vehicle body can be made to travel in a low-speed state in which the output speed of the engine is reduced to a lever-set rotational speed that is less than the stored rotational speed as long as the accelerator pedal is not operated, and the vehicle body can be made to travel at a constant speed, which is the speed after deceleration. This is achieved by operating the accelerator lever so that the lever-set rotational speed is less than the stored rotational speed. In other words, in the stored constant speed state, the vehicle speed can be reduced and maintained using a familiar operation in that the accelerator lever is operated in the deceleration direction in the same manner as during the deceleration operation in the lever constant speed state in the case that a need to decelerate has arisen. Therefore, a transition can be easily made from the stored constant speed state to a lever-decelerated state with a familiar operation using the acceleration lever.

In another preferred embodiment of the present invention, the constant rotation control is terminated in the case of detecting an operation of the accelerator lever in which the target engine speed during execution of the constant rotation control becomes equal to or less than the idling speed. In accordance with this aspect, in the stored constant speed state, a deceleration state can be obtained in which the output speed of the engine has been reduced to a level equal to or less than the idling speed as long as the accelerator pedal has not been operated. This is achieved by operating the accelerator lever so that the lever-set rotational speed is equal to or less than the idling speed. In other words, in the stored constant speed state, the vehicle speed can be reduced using a familiar operation in that the accelerator lever is operated in the deceleration direction in the same manner as during the deceleration operation in the lever constant speed state in the case that a need to decelerate has arisen. Therefore, a transition can be easily and reliably made from the stored constant speed state to the lever-decelerated state with a familiar operation using the acceleration lever.

In another preferred embodiment of the present invention, the constant rotation control is terminated and accelerator control having a higher target engine speed among the foot accelerator control and the hand accelerator control is carried out in the case that the accelerator lever operation is detected in the direction in which the target engine speed is increased during execution of the constant rotation control, and that the target engine speed based on the accelerator lever operation is greater than the engine speed stored in the storage means. In accordance with this aspect, the accelerator pedal is operated so that the lever-set rotational speed is greater than the stored rotational speed in the stored constant speed state, whereby the vehicle body can be made to travel in a state of acceleration in which the output speed of the engine is increased to the lever-set rotational speed and made greater than the stored rotational speed, and the vehicle body can be made to travel at a constant speed, which is the speed after acceleration. This is achieved by operating the accelerator lever so that the lever-set rotational speed is greater than the stored rotational speed. In other words, in the stored constant speed state, the vehicle speed can be increased and maintained using a familiar operation in that the accelerator lever is operated in the acceleration direction in the same manner as during the acceleration operation in the lever constant speed state in the case that a need to accelerate has arisen.

In another preferred embodiment of the present invention, the engine speed control system further comprises upper limit setting means for setting an upper limit of an engine speed; and an upper limit rotation controller for carrying out upper limit rotation control to limit the target engine speed to an upper limit rotational speed set by the upper limit setting means, wherein the upper limit rotation control is carried out with priority given to the constant rotation control when the upper limit rotational speed set by the upper limit setting means during execution of the constant rotation control is less than the engine speed stored in the storage means; and the upper limit rotation control is terminated and the constant rotation control is carried out again when the upper limit rotational speed becomes greater than the engine speed stored in the storage means during priority execution of the upper limit rotation control. In accordance with this aspect, in the stored constant speed state, the upper limit setting means is operated so that the upper limit rotational speed becomes less than the stored rotational speed, whereby the vehicle body can be made to travel in an upper limit constant speed state in which the rotational speed is less than the stored constant speed state. In the upper limit constant speed state, it is possible to easily return to the stored constant speed state by operating the upper limit setting means so that the upper limit rotational speed is greater than the stored rotational speed. In other words, the rotational speed at a constant speed level can be finely adjusted by operating the upper limit setting means based on the stored rotational speed, and the fine adjustment of the rotational speed at a constant speed level that corresponds to field conditions and the like can thereby be easily carried out by operating the upper limit setting means in the case that the stored constant speed state is to be used for work.

In the case that slippage has occurred in the stored constant speed state, the degree of slippage can be reduced to increase a gripping force, and it is possible to easily escape from the slippage state by operating the upper limit setting means so that the upper limit rotational speed becomes less than the stored rotational speed. Return to the stored constant speed state can be easily achieved by operating the upper limit setting means so that the upper limit rotational speed becomes greater than the stored rotational speed after escape from the slippage state. Therefore, the escape operation for the case in which slippage has occurred during travel at the stored constant speed state, and restoration to a constant speed state after escape from a slippage state, can be carried out in a simple manner, and the rotational speed at a constant speed level that corresponds to field conditions or the like in a stored constant speed state can be finely adjusted in a simple manner.

In another preferred embodiment of the present invention, further provided are upper limit setting means and an upper limit rotation controller such as those described above, wherein the constant rotation control is terminated when the upper limit rotational speed set by the upper limit setting means during execution of the constant rotation control is less than the engine speed stored in the storage means; accelerator control having a higher target engine speed among the foot accelerator control and the hand accelerator control is executed in the case that both the target engine speed based on the pedal sensor and the target engine speed based on the lever sensor at the time of termination of the constant rotation control are less than the upper limit rotational speed; and the upper limit rotation control is carried out in the case that one speed among the target engine speed based on the pedal sensor and the target engine speed based on the lever sensor at the time of termination of the constant rotation control is higher than the upper limit rotational speed. In accordance with this aspect, in the stored constant speed state, the input device is operated to transition from the stored constant speed state to the lever constant speed state when the upper limit setting means is set so that the upper limit rotational speed becomes greater than the lever-set rotational speed. Also, in the stored constant speed state, when the upper limit setting means is set so that the upper limit rotational speed is less than the lever-set rotational speed, the input device is operated, whereby it is possible to transition from the stored constant speed state to an upper limit constant speed state in which the engine speed is less than the lever constant speed state. In other words, fine adjustment based on the lever-set rotational speed is made possible by using the upper limit setting means to set the engine speed in a constant speed state in which a transition is made from the stored constant speed state by operating the input device.

In the case that slippage has occurred in the lever constant speed state, the degree of slippage can be reduced to increase the gripping force, and it is possible to easily escape from the slippage state by setting the upper limit setting means so that the upper limit rotational speed becomes less than the lever rotational speed. Return to the stored constant speed state can be easily achieved by setting the upper limit setting means so that the upper limit rotational speed becomes greater than the lever rotational speed after escape from the slippage state. Therefore, the escape operation for the case in which slippage has occurred during travel at the lever constant speed state, and restoration to a constant speed state after escape from a slippage state, can be carried out in a simple manner.

In another preferred embodiment of the present invention, two types of engine speeds that can be selected by operating the input device are stored the storage means, and the selected engine speed is used as the target engine speed in the constant rotation control. In accordance with this aspect, a switch is operated and the engine speed (hereinafter referred to as "first stored rotational speed") stored in the storage means is selected, whereby the vehicle body can be made to travel in a constant speed state (hereinafter referred to as "first stored constant speed state") brought about by the first stored rotational speed. Another engine speed (hereinafter referred to as "second stored rotational speed") is selected to thereby cause the vehicle body to travel in a constant speed state (hereinafter referred to as "second stored constant speed state") brought about by the second stored rotational speed. In other words, two types of constant speed can be obtained, a first stored constant speed state and a second stored constant speed state. For this reason, a constant speed state for puddling work and a constant speed state for tilling work can be established in a simple manner by operating a switch when the first stored constant speed state is used for puddling work and the second stored constant speed state is used for tilling work. Also, a constant speed state for work and a constant speed state for headland turning can be established in a simple manner by operating a switch when the first stored constant speed state is used for work and the second stored constant speed state is used for headland turning. Therefore, the switching can be performed using a switch operation in a simple manner while making it possible to switch between a first stored constant speed state and a second stored constant speed state that correspond to the work or the like.

In another preferred embodiment of the present invention, a momentary switch for enabling selection of one of the engine speeds and a momentary switch for enabling selection the other of the engine speeds are provided as the input device. In accordance with this aspect, the vehicle body can be made to travel in a first stored constant speed state using a first stored rotational speed by operating one of the momentary switches. Also, the vehicle body can be made to travel in a second stored constant speed state using a second stored rotational speed by operating the other of the momentary switches. In other words, since a momentary switch dedicated to selecting the first stored constant speed state and a momentary switch dedicated to selecting the second stored constant speed state are provided, the occurrence of selection mistakes can be reduced in comparison with the case in which the first stored constant speed state and the second stored constant speed state are selected using a single switch. Therefore, the likelihood that the first stored constant speed state and the second stored constant speed state will be mistakenly selected is reduced.

In another preferred embodiment of the present invention, engine speed control is carried out at a variable speed that is less than the variable speed of reduction of the engine output rotational speed based on the operation of the input device in the case that the output speed of the engine increases due to termination of the constant rotation control. In accordance with this aspect, variation in the output rotational speed when the output speed of the engine increases is smoothed in comparison with a case in which the output speed of the engine is reduced. Therefore, variation in the speed during acceleration travel in which the output speed of the engine is increased can be smoothed in comparison with a deceleration travel process in which the output speed of the engine is reduced. As a result, the riding comfort during acceleration travel can be further improved.

In accordance with a particularly preferred embodiment of the present invention and to allow the driver to see the engine speed stored in the storage means as the target of control in the constant rotation control during the interval in which the constant speed travel state of the vehicle body is obtained by constant rotation control, the rotational speed that is read from the storage means on the basis of an input to the input device is displayed on a display device that switchably displays various types of information, and the constant rotation control is carried out after the engine speed has been displayed.

Other features and advantages of the present invention will be made apparent from the description of embodiments below with reference to the diagrams.

DESCRIPTION OF THE PREFERRED EMBODIMENTS

Embodiments in which the engine speed control system of a work vehicle according to the present invention has been applied to a tractor as an example of a work vehicle will be described with reference to the diagrams as examples of a preferred embodiment for implementing the present invention.

Figure 1:
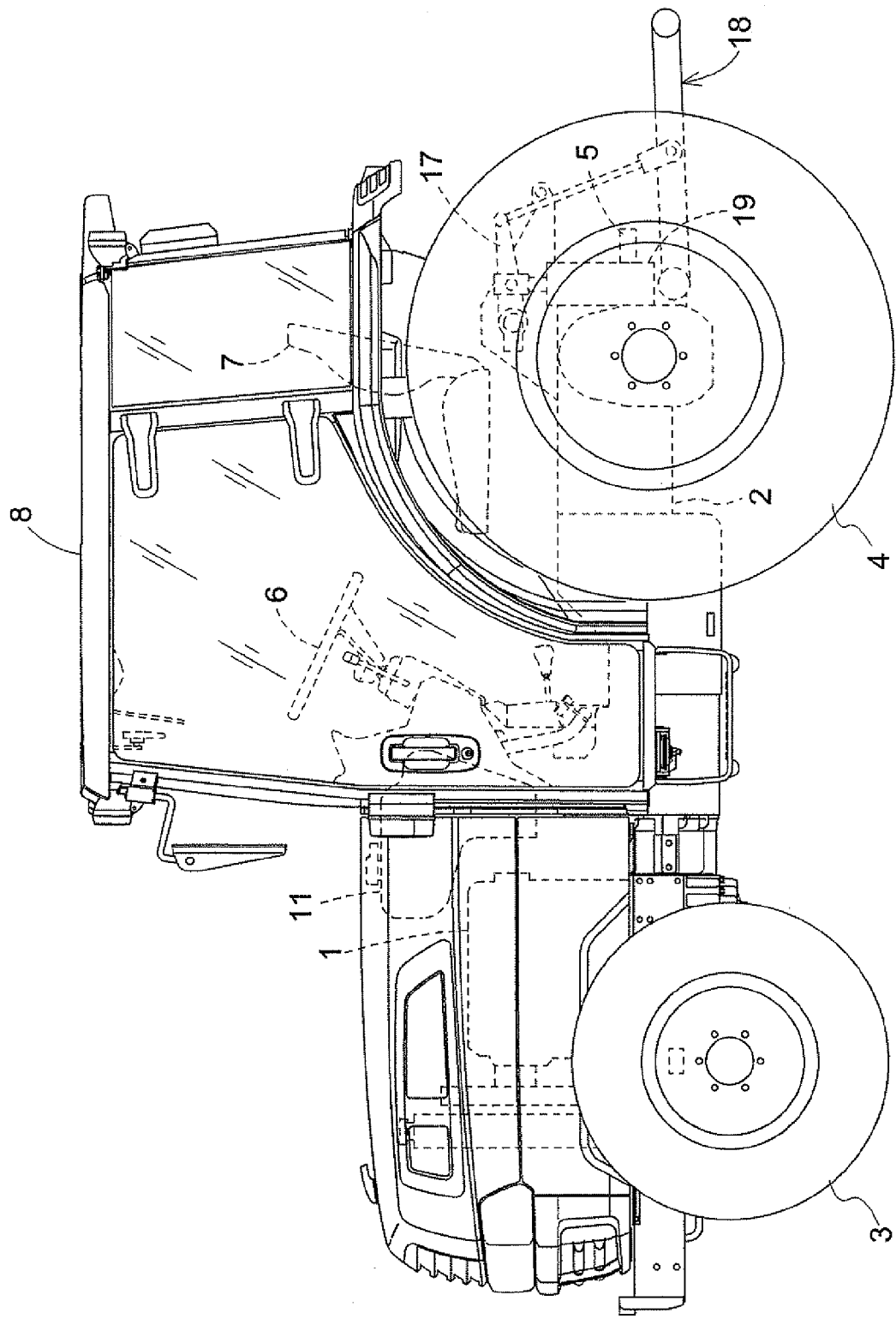
FIG. 1 is a side view of an entire tractor.

FIG. 1 is a side view of an entire tractor. The tractor has an engine 1 mounted in the front section. The rotational power outputted by the engine 1 is transmitted to left and right pairs of front wheels 3 and rear wheels 4 via a clutch (not shown) for interrupting the rotational power, a speed change device (not shown) housed in a transmission case 2 that doubles as a frame, and other components, and to a power take-off shaft 5 disposed so as to protrude toward the rear from the transmission case 2. A steering wheel 6 for steering the front wheels, a driver's seat 7, and the like are disposed in the rear section of the tractor to form a passenger/driver section 8, and a cabin 9 for covering the passenger/driver section 8 is mounted on the rear section of the tractor.

Figure 2:
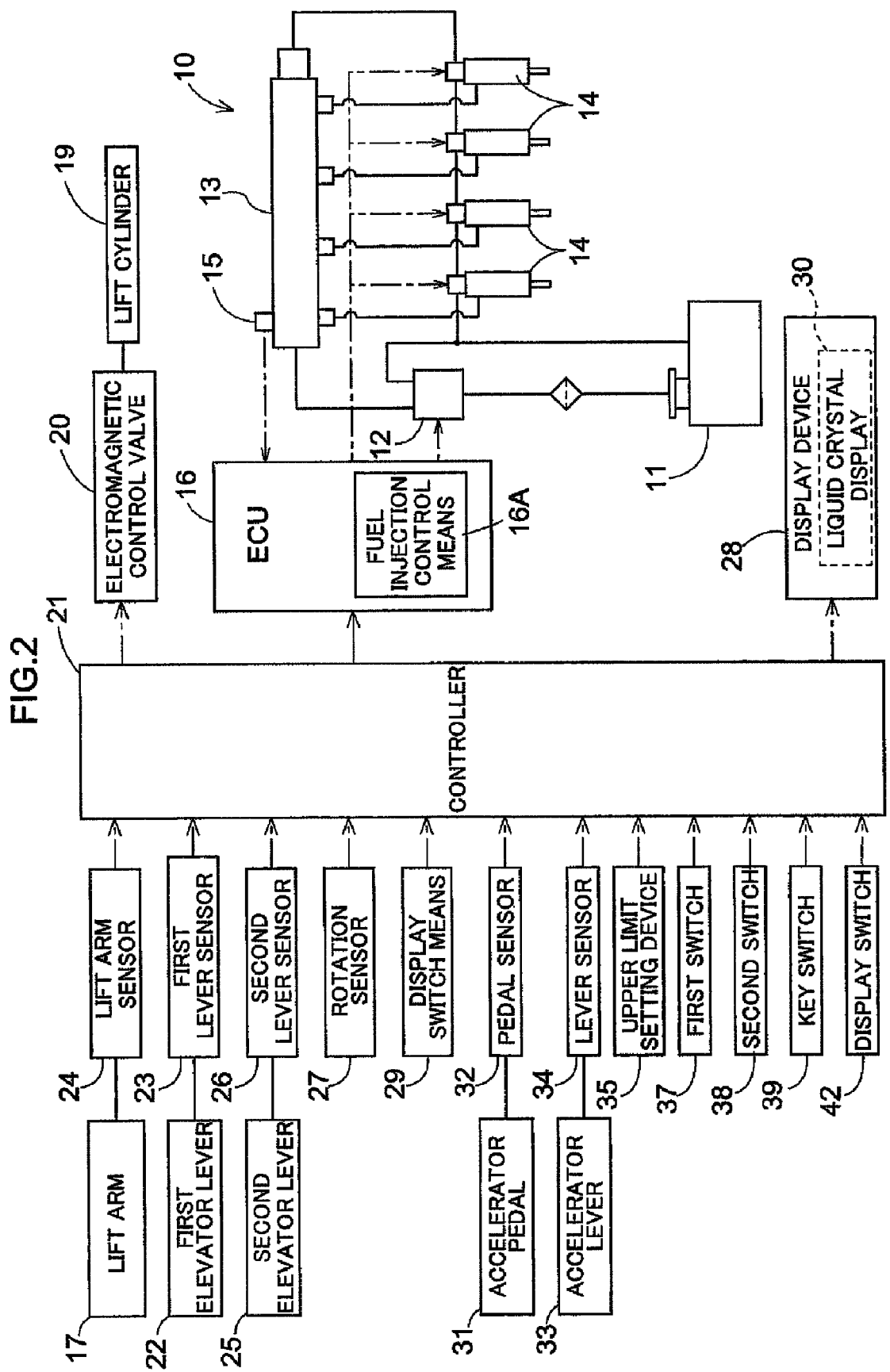
FIG. 2 is a block diagram showing the control system mounted in the tractor.

A common rail fuel injection device 10 for electronically controlling fuel injection timing and quantity is provided to the engine 1, as shown in FIG. 2. The fuel injection device 10 is provided with a supply pump 12 for pumping fuel held in a fuel tank 11; a common rail 13 for accumulating pumped fuel; a plurality of injectors 14 for injecting accumulated fuel into a fuel chamber (not shown); a pressure sensor 15 for detecting pressure inside the common rail 13; an engine control unit (hereinafter abbreviated to ECU) for controlling the actuation of the supply pump 12, the injectors 14, and other components on the basis of output from the pressure sensor 15 and the like; and other components.

The rear section of the transmission case 2 is provided with a left and right pair of lift arms 17, a link mechanism 18 for connecting implements, and a left and right pair of lift cylinders 19 for slidably driving the left and right lift arms 17 in the vertical direction, as well as other components, as shown in FIG. 1. A rotary tiller, a plow, and various other implements (not shown) can be elevatably or elevatably and rollably interchanged in accordance with the type of work.

A single-acting hydraulic cylinder is used as the left and right lift cylinders 19. The left and right lift cylinders 19 retractably operate when the flow of a hydraulic fluid to the cylinders is controlled by the operation of an electromagnetic control valve 20.

Figure 3:
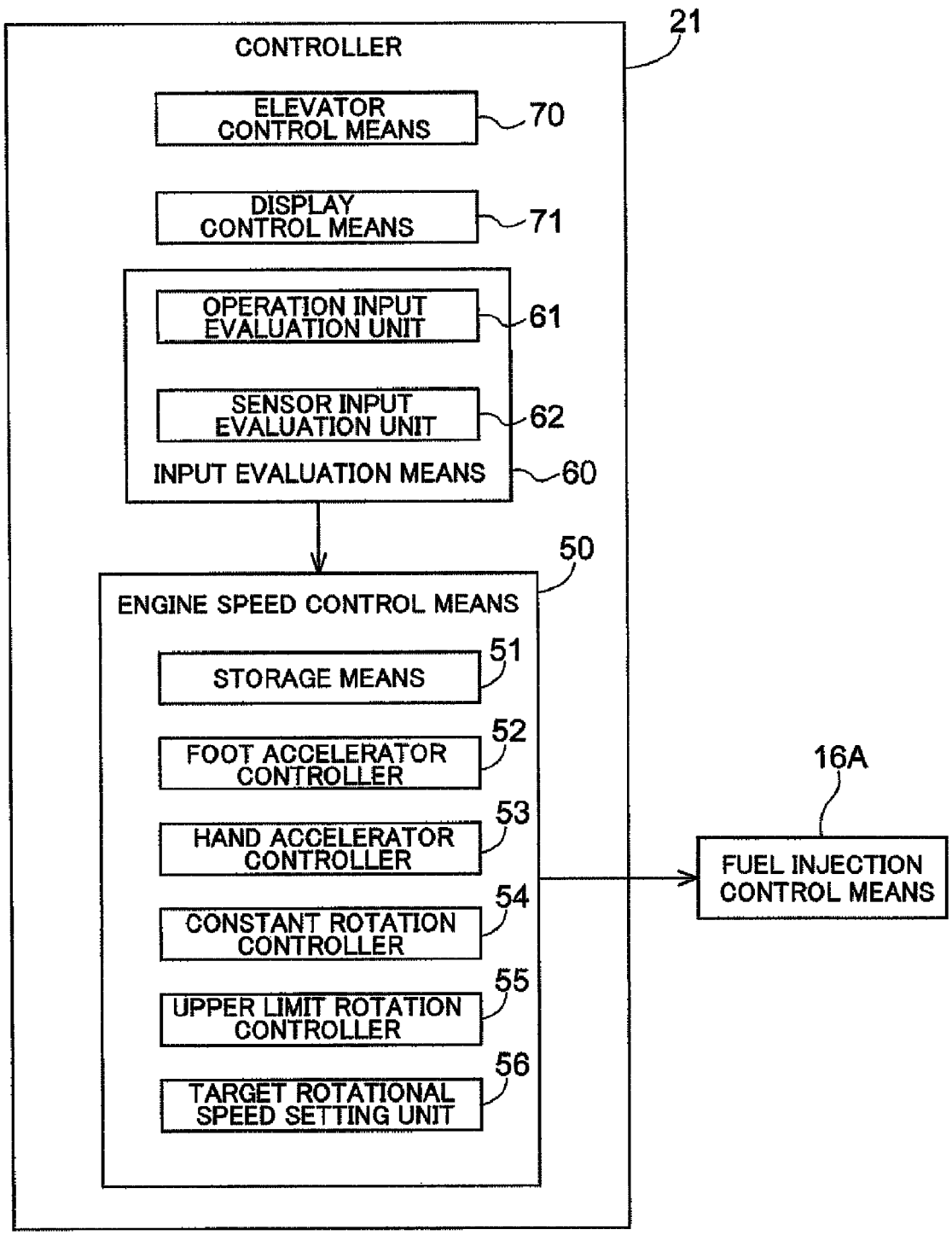
FIG. 3 is control block diagram of the engine speed control system.

A controller 21 composed of a microcomputer is mounted in the tractor, as shown in FIGS. 2 and 3. Input evaluation means 60 for evaluating various input signals and generating required control commands, control parameters, and the like is provided to the controller 21. The input evaluation means 60 includes an operation input evaluation unit 61 for evaluating operation signals from a switch or another input device that is directly operated by a user, and a sensor input evaluation unit 62 for evaluating detection signals from various sensors.

An elevator control device 70 for controlling the elevation of an implement is provided as a control program to the controller 21.

The elevator control device 70 performs position control for positioning the implement in a position of any height, forcible elevator control for forcibly elevating the implement to the upper limit position, as well as other types of control.

In the position control, the operation of the electromagnetic control valve 20 is controlled and the left and right lift cylinders 19 are retractably operated so that the output of a lift arm sensor 24 corresponds to the output of a first lever sensor 23 (falls within the width of the dead zone of the output of the first lever sensor 23) on the basis of the output of the first lever sensor 23 for detecting the operative position of the first elevator lever 22, the output of the lift arm sensor 24 for detecting the vertical pivot angle of the lift arms 17, and the map data for elevating/lowering that corresponds to the above outputs.

The forcible elevator control is carried out with priority given to other elevator control in the case that a second lever sensor 26 for detecting the operation of a second elevator lever 25 detects an operation upward from an intermediate position of the second elevator lever 25. In forcible elevator control, the operation of the electromagnetic control valve 20 is controlled and the left and right lift cylinders 19 are extended and operated so that the output of the lift arm sensor 24 corresponds to the elevation upper limit value (falls within the width of the dead zone of the upper limit value of the elevation) on the basis of the output of the lift arm sensor 24 and the preset elevation upper limit value. When the second lever sensor 26 detects a downward operation from the intermediate position of the second elevator lever 25 after the forcible elevator control, the operation of the electromagnetic control valve 20 is controlled and the left and right lift cylinders 19 are retractably operated so that the output of the lift arm sensor 24 corresponds to the output of the first lever sensor 23 (falls within the width of the dead zone of the output of the first lever sensor 23) on the basis of the output of the first lever sensor 23, the output of the lift arm sensor 24, and the map data for elevation. Forcible elevator control is ended thereafter.

In the map data for elevation, the output of first lever sensor 23 is used as the target height position of the implement, the output of the lift arm sensor 24 is used as the actual height position of the implement, and the outputs are correlated.

In other words, the elevator control device 70 carries out arbitrary elevation control on the basis of the operation of the first elevator lever 22, whereby the implement can be elevated or lowered to any height position that corresponds to the operative position of the first elevator lever 22.

The elevator control device 70 carries out forcible elevator control on the basis of the operation of the second elevator lever 25, whereby the implement can be automatically elevated to an elevation upper limit position that corresponds to the preset elevation upper limit value, and the implement can be automatically lowered to any height position that corresponds to the operative position of the first elevator lever 22.

Therefore, in the case that, for example, a rotary tiller or another implement is connected to the rear portion of the tractor to perform tilling work, the height position of the implement is arbitrarily set to perform tilling work so that a desired tilling depth can be obtained by operating the first elevator lever 22; and when a headland turn for changing the direction of the vehicle body is started at the edge of the field during tilling work, the implement can be elevated in a simple manner to the upper limit position by operating the second elevator lever 25 in the upward direction. As a result, it is possible to easily avoid the occurrence of a problem in which the inside of the turn is tilled because the implement turns while making contact with the ground. Also, the implement can be lowered in a simple manner to any work height position set by the operation of the first elevator lever 22. This is achieved by operating the second elevator lever 25 in the downward direction immediately prior to the end of headland turning. As a result, tilling work can be restarted at the end of a headland turn.

The first elevator lever 22 is a forward/rearward sliding-type position-holding lever disposed on the right side of the driver's seat 7. The second elevator lever 25 is a vertical sliding-type neutral return lever disposed to the right and below a steering wheel 6. A rotary potentiometer is used as the first lever sensor 23 and the lift arm sensor 24. A switch is adopted for the second lever sensor 26 and is provided with a first contact point in which the lever is closed in coordination with the upward operation of the second elevator lever 25, and a second contact point in which the lever is closed in coordination with the downward operation of the second elevator lever 25.

The controller 21 has a display control means 71 as a control program for displaying, based on the output of an electromagnetic pickup-type rotary sensor 27 for detecting the output speed of the engine i, the output speed of the engine 1 and other information on a liquid crystal monitor 30 as a display device for a display panel 28 provided to the passenger/driver section 8. The display control means 71 selectively displays an hour meter, remaining fuel, and the like, as well as the gear position, vehicle speed, and information related to the vehicle speed on the liquid crystal monitor 30 on the basis of the operation or the like of a display switch 29 disposed in the vicinity of the display panel 28.

The controller 21 is furthermore provided with engine speed control means 50 as a control program. The engine speed control means 50 has a foot accelerator controller 51 for carrying out foot accelerator control brought about by operation of the accelerator pedal 31, a hand accelerator controller 52 for carrying out hand accelerator control brought about by operation of the accelerator lever 33, a constant rotation controller 53 for carrying out constant speed control in which a predetermined engine speed stored in storage means 56 is used as a target rotational speed on the basis of the user operation of switches 37, 38 as a manually operated input device, an upper limit rotation controller 54 for carrying out upper limit rotation control to limit the engine speed to an upper limit rotational speed set by an upper-limit setting device 35 that functions as upper limit setting means for setting the upper limit of the engine speed, and a target rotational speed setting unit 55 for setting the ultimate target speed of the engine 1 in cooperation with the controllers described above.

The engine speed control means 50 is also provided with a first map data in which the engine speed and the output of the pedal sensor 32 for detecting the operative position of the accelerator pedal 31 are correlated; a second map data in which the engine speed and the output of a lever sensor 34 for detecting the operative position of the accelerator lever 33 are correlated; a third map data in which the engine speed and the output of the upper-limit setting device 35 for setting the upper limit of the rotational speed are correlated; and other types of data.

The target rotational-speed setting unit 55 selects the engine speed (hereinafter referred to as "pedal-set rotational speed") that corresponds to the output of the pedal sensor 32 on the basis of the output of the pedal sensor 32 and the first map data; selects the engine speed (hereinafter referred to as "lever-set rotational speed") that corresponds to the output of the lever sensor 34 based on the output of the lever sensor 34 and the second map data; and selects the engine speed (hereinafter referred to as "upper limit rotational speed") that corresponds to the output of the upper-limit setting device 35 on the basis of the output of the upper-limit setting device 35 and the third map data.

The higher rotational speed among the pedal-set rotational speed and the lever-set rotational speed is set as the target rotational speed when the rotational speed selected among the above is compared and the pedal-set rotational speed and the lever-set rotational speed are less than the upper limit rotational speed. The upper limit rotational speed is set as the target rotational speed when one speed among the pedal-set rotational speed and the lever-set rotational speed is greater than the upper limit rotational speed.

The accelerator pedal 31 is a depressively operated pedal of the initial position return type disposed in the right foot area of the passenger/driver section 8. The accelerator lever 33 is a position-holding lever of the forward/rearward sliding type disposed on the right side of the driver's seat 7. The upper-limit setting device 35 is configured as a dial-type device using a rotary potentiometer or the like.

An ECU 16 is provided with fuel injection control means 16A as a control program for controlling the operation of the supply pump 12, the injectors 14, and the like so that the target rotational speed is obtained as the output speed of the engine 1 on the basis of a target rotational speed set by the target rotational-speed setting unit 55 of the controller 21, the output of the rotation sensor 27 inputted by way of the controller 21, and the like.

The engine speed control means 50 operates in cooperation with the fuel injection control means 16A of the ECU 16 and controls the output speed of the engine 1.

The engine speed control means 50 sets the pedal-set rotational speed to the target rotational speed when the pedal-set rotational speed is greater than the lever-set rotational speed in a state in which the pedal-set rotational speed and the lever-set rotational speed are less than the upper limit rotational speed, and carries out foot accelerator control for controlling the output speed of the engine 1 so that the pedal-set rotational speed is obtained as the output speed of the engine 1. Conversely, [the engine speed control means] sets the lever-set rotational speed as the target rotational speed when the lever-set rotational speed is greater than the pedal-set rotational speed, and carries out hand accelerator control for controlling the output speed of the engine 1 so that the lever-set rotational speed is obtained as the output speed of the engine 1. Also, [the engine speed control means] sets the upper limit rotational speed to the target rotational speed when one speed among the pedal-set rotational speed and the lever-set rotational speed is greater than the upper limit rotational speed, and carries out upper limit rotation control for controlling the output speed of the engine 1 so that the upper limit rotational speed is obtained as the output speed of the engine 1.

In accordance with this configuration, the vehicle body can be made to travel in a lever constant speed state for maintaining the output speed of the engine 1 at the lever-set rotational speed by, e.g., operating the accelerator lever 33 to an arbitrary operative position or by operating the upper limit-setting device 35 so that the upper limit rotational speed does not become less than the lever-set rotational speed. In this lever constant speed state, the accelerator pedal 31 is operated so that the pedal-set rotational speed becomes greater than the lever-set rotational speed, whereby the vehicle body can be made to travel in a pedal acceleration state in which the output speed of the engine 1 is increased from the lever-set rotational speed to the pedal-set rotational speed during the interval in which the accelerator pedal operation has been operated. In the pedal acceleration state, the vehicle body can be made to travel in an upper limit constant speed state, which limits the output speed of the engine 1 to the upper limit rotational speed, when the pedal-set rotational speed becomes greater than the upper limit rotational speed. It is possible to return to the lever constant speed state in simple manner by cancelling the operation of the accelerator pedal 31.

In other words, high and low two-stage constant speed states, i.e., the lever constant speed state and the upper limit constant speed state can be obtained, and variable speed operation can be arbitrarily carried out across a lever constant speed state and an upper limit constant speed state.

In the lever constant speed state, the vehicle body can be made to travel in an upper limit constant speed state in which the rotational speed is less than the lever constant speed state. This is achieved by operating the upper-limit setting device 35 so that the upper limit rotational speed becomes less than the lever-set rotational speed. In the upper limit constant speed state, it is possible to return to the lever constant speed state in a simple manner by operating the upper-limit setting device 35 so that the upper limit rotational speed becomes greater than the lever-set rotational speed.

In other words, the rotational speed at a constant speed level can be finely adjusted by operating the upper-limit setting device 35 based on the lever-set rotational speed. As a result, a set constant rotational speed that corresponds to the field conditions or the like can easily be changed.

The accelerator lever 33 can be set to the idling position, and the upper-limit setting device 35 can be operated so that the upper limit rotational speed is an engine speed suitable for work, whereby the vehicle body can be made to travel in an upper limit constant speed state at which the output speed of the engine 1 is maintained at an upper limit rotational speed suitable for work. This is achieved by depressing the accelerator pedal 31 to the operation limit position. In the upper limit constant speed state, the vehicle body can be made to travel in a pedal deceleration state in which the output speed of the engine 1 is brought below the upper limit rotational speed by letting up on the depression of the accelerator pedal 31 so that the pedal-set rotational speed is brought below the upper limit rotational speed. In the pedal deceleration state, it is possible to return to the upper limit constant speed state by again depressing the accelerator pedal 31 as far as the operation limit position.

When the upper-limit setting device 35 is thus operated so that the upper limit rotational speed is an engine speed suitable for work, a constant speed state suitable for work can be stably obtained by operating the accelerator pedal 31, regardless of the shaking of the vehicle body caused by the roughness of the field and the like. This is achieved by depressing the accelerator pedal 31 to the operation limit position when traveling forward during work. In the case of making a headland turn, a deceleration state suitable for a headland turn can be easily achieved by reducing the operation of the accelerator pedal 31 prior to initiating the headland turn. Also, when slippage occurs in a constant speed state, it is possible to reduce the amount of slippage, increase the gripping force, and escape from the slippage state in a simple manner by letting up on the depression of the accelerator pedal 31 and reducing the engine speed. A constant speed state suitable for work can easily be reproduced by depressing the accelerator pedal 31 to the operation limit position after a headland turn or after escaping from the slippage state.

In other words, it is possible to easily maintain a travel state suitable for turnaround work in which forward travel and headland turning is repeated, or to obtain a travel state suitable for heavy towing work in which a plow, subsoiler, or another readily slipping implement is connected.

The controller 21 has a first stored rotational speed that is read based on the operation of the first switch 37 composed of a momentary switch disposed on the right side of the driver's seat 7, and a second stored rotational speed that is read based on the operation of the second switch 38 composed of a momentary switch disposed adjacent to the first switch 37.

The target rotational-speed setting unit 55 essentially sets the first stored rotational speed to a target rotational speed on the basis of the output of the first switch 37 when the first switch 37 is operated in the lever constant speed state in which the accelerator lever 33 is moved to an operative position in which the output speed of the engine 1 becomes greater than the idling speed. In a state in which the first stored rotational speed is set to the target rotational speed, the time until the first switch 37 returns to the initial position is measured when the first switch 37 is operated, and as long as the measured time is within a set time (e.g., within three seconds), the pedal-set rotational speed, the lever-set rotational speed, and the upper limit rotational speed are compared based on the output of the first switch 37 at that time, and the higher rotational speed among the pedal-set rotational speed and the lever-set rotational speed is set as the target rotational speed in the case that the pedal-set rotational speed and the lever-set rotational speed are less than the upper limit rotational speed. The upper limit rotational speed is set to the target rotational speed in the case that one speed among the pedal-set rotational speed and the lever-set rotational speed is greater than the upper limit rotational speed.

The second stored rotational speed is set to the target rotational speed on the basis of the output of the second switch 38 when the second switch 38 is operated in a lever constant speed state in which the accelerator lever 33 is moved to a operative position in which the output speed of the engine 1 becomes greater the idling speed. In a state in which the second stored rotational speed is set to the target rotational speed, the time until the second switch 38 returns to the initial position is measured when the second switch 38 is operated, and as long as the measured time is within a set time (e.g., within three seconds), the pedal-set rotational speed, the lever-set rotational speed, and the upper limit rotational speed are compared based on the output of the second switch 38 at that time, and the higher rotational speed among the pedal-set rotational speed and the lever-set rotational speed is set as the target rotational speed in the case that the pedal-set rotational speed and the lever-set rotational speed are less than the upper limit rotational speed. The upper limit rotational speed is set to the target rotational speed in the case that one speed among the pedal-set rotational speed and the lever-set rotational speed is greater than the upper limit rotational speed.

In other words, the engine speed control means 50 sets the first stored rotational speed to the target rotational speed when the first switch 37 is operated in the lever constant speed state, and the first constant rotation control is carried out to control the output speed of the engine 1 so that the first stored rotational speed is obtained as the output speed of the engine 1. The second stored rotational speed is set as the target rotational speed when the second switch 38 is operated in the lever constant speed state, and the second constant rotation control is carried out to control the output speed of the engine 1 so that the second stored rotational speed is obtained as the output speed of the engine 1.

In the case that the first switch 37 is briefly pressed so that the measurement time until the return of the first switch 37 to the initial position is within a set time during execution of the first constant rotation control, the first constant rotation control is ended and one type of control among the foot accelerator control, hand accelerator control, and upper limit rotation control is carried out based on the target rotational speed that is set in accordance with the operative state at that time. In the case that the second switch 38 is briefly pressed so that the measurement time until the return of the second switch 38 to the initial position is within a set time during execution of the second constant rotation control, the second constant rotation control is ended and one type of control among the foot accelerator control, hand accelerator control, and upper limit rotation control is carried out based on the target rotational speed that is set in accordance with the operative state at that time.

In accordance with this configuration, as long as the first stored rotational speed is set to the engine speed suitable for tilling work, and the second stored rotational speed is set to the engine speed suitable for puddling work, the vehicle body can be made to travel in a constant speed state (hereinafter referred to as "first stored constant speed state") for maintaining the output speed of the engine 1 at the first stored rotational speed suitable for tilling work. This is achieved by operating the first switch 37 after the accelerator lever 33 has been moved to the operative position in which the output speed of the engine 1 becomes greater than the idling speed. Also, the vehicle body can be made to travel in a constant speed state (hereinafter referred to as "second stored constant speed state") for maintaining the output speed of the engine 1 at the second stored rotational speed suitable for puddling work. This is achieved by operating the second switch 38 after the accelerator lever 33 has been moved to the operative position in which the output speed of the engine 1 becomes greater than the idling speed.

The accelerator lever 33 is operated so that the lever-set rotational speed becomes the engine speed suitable for headland turning, whereupon a deceleration state (hereinafter referred to as "lever deceleration state") that is induced by an accelerator lever 33 and is suitable for headland turning can be easily achieved by briefly pressing the first switch 37 prior to initiating the headland turning in the first stored constant speed state, and the first stored constant speed state suitable for tilling work can be easily reproduced by operating the first switch 37 immediately prior to the end of headland turning or after headland turning has ended. In the second stored constant speed state, the lever deceleration state can be easily achieved by briefly pressing the second switch 38 prior to initiating a headland turn. And the second stored constant speed state suitable for puddling work can be easily reproduced by operating the second switch 38 immediately prior to the end of headland turning or after headland turning has ended.

Also, a configuration is used in which constant rotation control is carried out on the basis of the operation of the first switch 37 or the second switch 38 only in the case in which the accelerator lever 33 has been moved to an operative position in which the output speed of the engine 1 becomes greater than the idling speed, whereby the engine speed control means 50 does not carry out constant rotation control due to the above operation even if the first switch 37 or the second switch 38 is operated in a stopped vehicle state in which power transmission from the engine 1 is cut off and the accelerator lever 33 is positioned in the idling position. Therefore, the output speed of the engine 1 does not increase unnecessarily due to operation of the first switch 37 or the second switch 38 in a stopped vehicle state.

Engine speed control means 50 transitions from first constant rotation control to second constant rotation control when the second switch 38 is operated during execution of the first constant rotation control, and transitions from second constant rotation control to first constant rotation control when the first switch 37 is operated during execution of the second constant rotation control.

In accordance with this configuration, as long as the first stored rotational speed is set to an engine speed suitable for work and the second stored rotational speed is set to an engine speed suitable for headland turning, the vehicle body can be made to travel in the first stored constant speed state suitable for work by operating the first switch 37 after the accelerator lever 33 has been moved to an operative position in which the output speed of the engine 1 becomes greater than the idling speed. The second stored constant speed state suitable for headland turning can be easily achieved by operating the second switch 38 prior to initiating a headland turn, and the first stored constant speed state suitable for work can be easily reproduced by operating the first switch 37 immediately prior to the end of headland turning or after headland turning has been completed.

The engine speed control means 50 carries out foot accelerator control with priority given to first constant rotation control when the pedal-set rotational speed becomes greater than the first constant rotation control during execution of the first constant rotation control. The foot accelerator control is ended and the first constant rotation control is restarted when the pedal-set rotational speed becomes less than the first stored rotational speed during priority execution of the foot accelerator control. The foot accelerator control is carried out with priority given to the second constant rotation control when the pedal-set rotational speed becomes greater than the second stored rotational speed during execution of the second constant rotation control. The foot accelerator control is ended and the second constant rotation control is restarted when the pedal-set rotational speed becomes less than the second stored rotational speed during priority execution of the foot accelerator control.

In accordance with this configuration, in the first stored constant speed state, the accelerator pedal 31 is operated so that the pedal-set rotational speed becomes greater than the first stored rotational speed, whereby the vehicle body can be made to travel in a pedal acceleration state in which the output speed of the engine 1 is increased from the first stored rotational speed to the pedal-set rotational speed during the interval in which the above operation is carried out. In the pedal acceleration state, the vehicle body can be made to travel in an upper limit constant speed state, which limits the output speed of the engine 1 to the upper limit rotational speed, when the pedal-set rotational speed becomes greater than the upper limit rotational speed. It is possible to return to the first stored constant speed state by cancelling the operation of the accelerator pedal 31.

In the second stored constant speed state, the accelerator pedal 31 is operated so that the pedal-set rotational speed becomes greater than the second stored rotational speed, whereby the vehicle body can be made to travel in a pedal acceleration state in which the output speed of the engine 1 is increased from the second stored rotational speed to the pedal-set rotational speed during the interval in which the above operation is carried out. In the pedal acceleration state, the vehicle body can be made to travel in an upper limit constant speed state, which limits the output speed of the engine 1 to the upper limit rotational speed, when the pedal-set rotational speed becomes greater than the upper limit rotational speed. It is possible to return to the second stored constant speed state by cancelling the operation of the accelerator pedal 31.

When the lever-set rotational speed is reduced to an idling speed during execution of the first constant rotation control, the engine speed control means 50 ends the first constant rotation control and carries out one type of control among the foot accelerator control, the hand accelerator control, and the upper limit rotation control on the basis of the target rotational speed set in accordance with the operational state at that time. When the lever-set rotational speed is reduced to an idling speed during execution of the second constant rotation control, the second constant rotation control is ended and one type of control among the foot accelerator control, the hand accelerator control, and the upper limit rotation control is carried out on the basis of the target rotational speed set in accordance with the operational state at that time.

In accordance with this configuration, in the constant speed state in which the output speed of the engine 1 is maintained at the first stored rotational speed or the second stored rotational speed, the accelerator lever 33 is operated so that the lever-set rotational speed is made equal to or less than the idling speed, whereby a deceleration state in which the output speed of the engine 1 is reduced to the idling speed or less can be established as long as the accelerator pedal 31 is not operated.

In other words, in a stored constant speed state in which the output speed of the engine 1 is kept at the first stored rotational speed or at the second stored rotational speed, the vehicle speed can be reduced using a familiar operation in that the accelerator lever 33 is operated in the deceleration direction in the same manner as during the deceleration operation in the lever constant speed state in the case that a need to decelerate has arisen.

When the lever-set rotational speed becomes greater than the first stored rotational speed during execution of the first constant rotation control, the engine speed control means 50 ends the first constant rotation control and carries out one type of control among the foot accelerator control, the hand accelerator control, and the upper limit rotation control on the basis of the target rotational speed set in accordance with the operational state at that time. When the lever-set rotational speed becomes greater than the second stored rotational speed during execution of the second constant rotation control, the second constant rotation control is ended and one type of control among the foot accelerator control, the hand accelerator control, and the upper limit rotation control is carried out on the basis of the target rotational speed set in accordance with the operational state at that time.

In accordance with this configuration, in the case that the lever-set rotational speed is equal to or less than the first stored rotational speed in the first stored constant speed state, the vehicle body can be made to travel in a state of acceleration in which the output speed of the engine 1 is increased to the upper limit rotational speed or the lever-set rotational speed greater than the first stored rotational speed by operating the accelerator lever 33 so that the lever-set rotational speed is made to be greater than the first stored rotational speed, and the vehicle body can be made to travel at a constant speed achieved after the acceleration.

Also, when the lever-set rotational speed is equal to or less than the second stored rotational speed in the second stored constant speed state, the vehicle body can be made to travel in a state of acceleration in which the output speed of the engine 1 is increased to the upper limit rotational speed or the lever-set rotational speed greater than the second stored rotational speed by operating the accelerator lever 33 so that the lever-set rotational speed is made to be greater than the second stored rotational speed, and the vehicle body can be made to travel at a constant speed achieved after the acceleration.

In other words, in a constant speed state in which the output speed of the engine 1 is maintained at the first stored rotational speed or the second stored rotational speed, the vehicle speed can be increased and maintained using a familiar operation in which the accelerator lever 33 is operated in the acceleration direction in the same manner as during the acceleration operation in the lever constant speed state in the case that a need to accelerate has arisen.

The engine speed control means 50 carries out upper limit rotation control with priority given to first constant rotation control when the upper limit rotational speed becomes less than the first stored rotational speed during first constant rotation control. The upper limit rotation control is ended and the first constant rotation control is restarted when the upper limit rotational speed becomes greater than the first stored rotational speed during priority execution of the upper limit rotation control. The upper limit rotation control is carried out with priority given to second constant rotation control when the upper limit rotational speed becomes less than the second stored rotational speed during execution of the second constant rotation control. The upper limit rotation control is ended and the second constant rotation control is restarted when the upper limit rotational speed becomes greater than the second stored rotational speed during priority execution of the upper limit rotation control.

In other words, in the first stored constant speed state, the vehicle body can be made to travel in an upper limit constant speed state in which the rotational speed is less than the first stored constant speed state by operating the upper-limit setting device 35 so that the upper limit rotational speed becomes less than the first stored rotational speed. In the upper limit constant speed state, it is possible to return to the first stored constant speed state in a simple manner by operating the upper-limit setting device 35 so that the upper limit rotational speed becomes greater than the first stored rotational speed.

In the second stored constant speed state, the vehicle body can be made to travel in an upper limit constant speed state in which the rotational speed is less than the second stored constant speed state by operating the upper-limit setting device 35 so that the upper limit rotational speed becomes less than the second stored rotational speed. In the upper limit constant speed state, it is possible to return to the second stored constant speed state in a simple manner by operating the upper-limit setting device 35 so that the upper limit rotational speed becomes greater than the second stored rotational speed.

In accordance with this configuration, the rotational speed at a constant speed level can be finely adjusted by operating the upper-limit setting device 35 based on the first stored rotational speed or the second stored rotational speed. As a result, the setting of the first stored rotational speed or the second stored rotational speed that corresponds to the field conditions or the like can easily be changed.

Also, it is possible to reduce the amount of slippage, increase the gripping force, and escape from a slippage state in a simple manner by operating the upper-limit setting device 35 so that the upper limit rotational speed becomes less than the first stored rotational speed in a case in which slippage occurs in the first stored constant speed state, and by operating the upper-limit setting device 35 so that the upper limit rotational speed becomes less than the second stored rotational speed in a case in which slippage occurs in the second stored constant speed state. It is possible to return to the first stored constant speed state or the second stored constant speed state, in which the output speed of the engine 1 is maintained at the first stored rotational speed or the second stored rotational speed, respectively, by operating the upper-limit setting device 35 so that the upper limit rotational speed becomes greater than the first stored rotational speed in the first stored constant speed state, or so that the upper limit rotational speed becomes greater than the second stored rotational speed in the second stored constant speed state after escaping from the slippage state.

The engine speed control means 50 transitions from the first constant rotation control or the second constant rotation control to one type of control among the foot accelerator control, the hand accelerator control, and the upper limit rotation control on the basis of the operation of the first switch 37 or the second switch 38, whereby the output speed of the engine 1 is controlled so that the variation in speed is reduced in comparison with the case in which the output speed of the engine 1 is reduced based on the operation of the first switch 37 or the second switch 38 when the output speed of the engine 1 increases.

Variation in the output rotational speed when the output speed of the engine 1 is increased can thereby be smoothed in comparison with the case in which the output speed of the engine 1 is reduced. As a result, variation in speed during acceleration travel in which the output speed of the engine is increased can be smoothed in comparison with a deceleration travel process in which the output speed of the engine is reduced, and the riding comfort during acceleration travel can be further improved.

The engine speed control means 50 transitions from the first constant rotation control to a first stored rotational speed variation control, which allows a change in the settings of the first stored rotational speed, on the basis of the output of the first switch 37 in the case that the first switch 37 has been pressed for a long period so that the measurement time until the return of the first switch 37 to the initial position exceeds the setting time; and transitions from the second constant rotation control to a second stored rotational speed variation control, which allows a change in the settings of the second stored rotational speed, on the basis of the output of the second switch 38 in the case that the second switch 38 has been pressed for a long period so that the measurement time until the return of the second switch 38 to the initial position exceeds the setting time during execution of the second constant rotation control.

When the first switch 37 is briefly pressed during the first stored rotational speed variation control, the first stored rotational speed is increased by an amount equal to a fixed rotational speed (e.g., 10 rpm) on the basis of the output of the first switch 37 at that time. When the second switch 38 is briefly pressed, the first stored rotational speed is reduced by an amount equal to a fixed rotational speed (e.g., 10 rpm) on the basis of the output of the second switch 38 at that time. When the first switch 37 is pressed for a long period, the first stored rotational speed is continuously increased during the interval in which the output is continuous (the interval in which the first switch 37 is pressed for a long period) on the basis of the output of the first switch 37 at that time. When the second switch 38 is pressed for a long period, the first stored rotational speed is continuously reduced during the interval in which the output is continuous (the interval in which the second switch 38 is pressed for a long period) on the basis of the output of the second switch 38 at that time. In the case that neither the first switch 37 nor the second switch 38 has been operated during the setting time (e.g., three seconds), the rotational speed at that stage is determined to be the first stored rotational speed, and a transition is made from the first stored rotational speed variation control to the first constant rotation control.

When the first switch 37 is briefly pressed during the second stored rotational speed variation control, the second stored rotational speed is increased by an amount equal to a fixed rotational speed (e.g., 10 rpm) on the basis of the output of the first switch 37 at that time. When the second switch 38 is briefly pressed, the second stored rotational speed is reduced by an amount equal to a fixed rotational speed (e.g., 10 rpm) on the basis of the output of the second switch 38 at that time. When the first switch 37 is pressed for a long period, the first stored rotational speed is continuously increased during the interval in which the output is continuous (the interval in which the first switch 37 is pressed for a long period) on the basis of the output of the first switch 37 at that time. When the second switch 38 is pressed for a long period, the second stored rotational speed is continuously reduced during the interval in which the output is continuous (the interval in which the second switch 38 is pressed for a long period) on the basis of the output of the second switch 38 at that time. In the case that neither the first switch 37 nor the second switch 38 has been operated during the setting time (e.g., three seconds), the rotational speed at that stage is determined to be the second stored rotational speed, and a transition is made from the second stored rotational speed variation control to the second constant rotation control.

In other words, the first switch 37 and the second switch 38 can be made to function as instruction means for issuing an instruction to execute the first constant rotation control or the second constant rotation control, instruction means for issuing an instruction to transition from the first constant rotation control to the first stored rotational speed variation control or issuing an instruction to transition from the second constant rotation control or the second stored rotational speed variation control, and a setting device for changing the setting of the first stored rotational speed or the second stored rotational speed. In comparison with the case in which operative devices that correspond to these functions are provided, costs can be cut and mounting space can be reduced.

In the power-on stage in which a key switch 39 is set in the on position, the engine speed control means 50 carries out first stored rotational speed variation control when the first switch 37 has been pressed for a long period, and the second stored rotational speed variation control is carried out when the second switch 38 has been pressed for a long period. The first stored rotational speed or the second stored rotational speed can be varied in accordance with the type of work or the like prior to starting the work.

Figure 4:
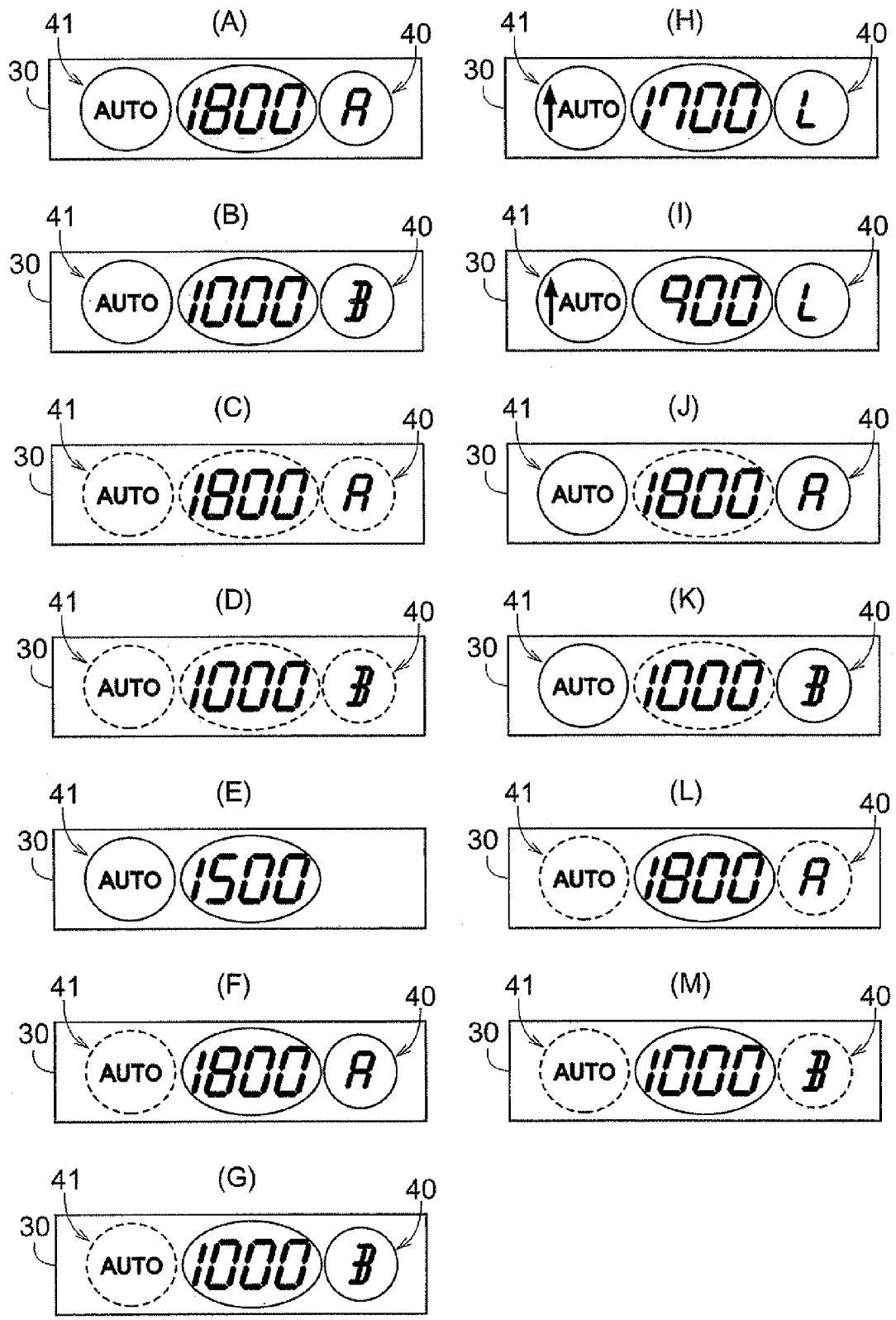
FIG. 4 is schematic diagram showing the display details switched using a liquid crystal device.

The engine speed control means 50 transmits display information to display control means 71 in accompaniment with the pressing operation when the first switch 37 is operated in a state in which the first constant rotation control can be carried out, and sequentially displays on the liquid crystal display 30 the first stored rotational speed ("1800" is shown as an example in this case), a first identification symbol 40 ("A" is shown as an example in this case) indicating the first stored rotational speed, and a second identification symbol 41 ("AUTO" is shown as an example in this case) indicating the execution of the first constant rotation control or the second constant rotation control. FIG. 4 is schematic diagram showing the display details switchably displayed on a liquid crystal display. First, reference will be made to the screen diagram indicated by (A) in FIG. 4. Hereinbelow, the screen diagram showing sequentially switched display content is indicated by an alphabet letter in parentheses. The first constant rotation control is initiated in accompaniment with the return of the first switch 37 to the initial position.

When the second switch 38 is operated in a state in which the second constant rotation control can be carried out, display information is transmitted to the display control means 71 in accompaniment with the pressing operation at that time, and the liquid crystal display 30 sequentially displays the second stored rotational speed ("1000" is shown as an example in this case), a first identification symbol 40 ("B" is shown as an example in this case) indicating the second stored rotational speed, and a second identification symbol 41 ("AUTO" is shown as an example in this case) indicating the execution of the first constant rotation control or the second constant rotation control (see (B) of FIG. 4). The second constant rotation control is initiated in accompaniment with the return of the second switch 38 to the initial position.

In other words, the target rotational speed and the like in the constant rotation controls can be displayed on the liquid crystal display 30 and visually presented to the driver at a stage prior to the output speed of the engine 1 being changed in accompaniment with the start of the first constant rotation control or the second constant rotation control. This can be achieved without providing a dedicated display unit for displaying the first stored rotational speed, the second stored rotational speed, and the like. The display state of the liquid crystal display 30 switches to a state in which the target rotational speed or the like in the first constant rotation control or the second constant rotation control is displayed in accompaniment with the operation of the first switch 37 or the second switch 38. Therefore, the information is more easily presented to the driver in comparison with the case in which the target rotational speed or the like is constantly displayed as part of the first constant rotation control or the second constant rotation control.

The engine speed control means 50 intermittently displays (see (C) of FIG. 4) on the liquid crystal display 30 the first stored rotational speed ("1800," in this case), a first identification symbol 40 ("A," in this case), and a second identification symbol 41 ("AUTO," in this case), when the first switch 37 has been operated in a state in which the accelerator lever 33 is positioned in an operative position in which the output speed of the engine 1 is equal to or less than the idling speed.

Also, the second stored rotational speed ("1000," in this case), a first identification symbol 40 ("B," in this case), and a second identification symbol 41 ("AUTO," in this case) are intermittently displayed (see (D) of FIG. 4) on the liquid crystal display 30 when the second switch 38 has been operated in a state in which the accelerator lever 33 is placed in an operative position in which the output speed of the engine 1 is equal to or less than the idling speed.

The fact that the first constant rotation control or the second constant rotation control will not be carried out can be visually presented to the driver regardless of the operation of the first switch 37 or the second switch 38 by placing the accelerator lever 33 in an operative position in which the output speed of the engine 1 is less than the idling speed.

When the first switch 37 is briefly pressed during execution of the first constant rotation control in which the first stored rotational speed is set to the target rotational speed, the engine speed control means 50 transmits display information to the display control means 71 in accompaniment with pressing operation at that time; continuously displays on the liquid crystal display 30 the target rotational speed ("1500" is shown as an example in this case) set in accordance with the operational state after completion of the first constant rotation control, in place of the first stored rotational speed; and ends display of the first identification symbol 40 (see (A) and (E) of FIG. 4). The first constant rotation control is ended in accompaniment with the return of the first switch 37 to the initial position, and one type of control among the foot accelerator control, the hand accelerator control, and the upper limit rotation control that corresponds to the operational state at that time is started.

When the second switch 38 is briefly pressed during execution of the second constant rotation control in which the second stored rotational speed is set to the target rotational speed, the display information is transmitted to the display control means 71 in accompaniment with the pressing operation at that time; the liquid crystal display 30 continuously displays, in place of the second stored rotational speed, the target rotational speed ("1500," in this case) set in accordance with the operational state after completion of the second constant rotation control; and display of the first identification symbol 40 is ended (see (B) and (E) of FIG. 4). The second constant rotation control is ended in accompaniment with the return of the second switch 38 to the initial position, and one type of control among the foot accelerator control, the hand accelerator control, and the upper limit rotation control that corresponds to the operational state at that time is started.

In other words, the target rotational speed after completion of the first constant rotation control or the second constant rotation control is displayed on the liquid crystal display 30 and visually presented to the driver at a stage prior to the output speed of the engine 1 being changed in accompaniment with transition from the first constant rotation control or the second constant rotation control to the foot accelerator control, the hand accelerator control, or the upper limit rotation control.

When the second switch 38 is operated during execution of the first constant rotation control, the engine speed control means 50 transmits the display information to the display control means 71 in accompaniment with the pressing operation at that time, continuously displays on the liquid crystal display 30 the second stored rotational speed ("1000" is shown as an example in this case) in place of the first stored rotational speed ("1800," in this case), and changes the first identification symbol 40 from one that shows the first stored rotational speed ("A," in this case) to one that shows second stored rotational speed ("B," in this case) (see (A) and (B) of FIG. 4). A transition is then made from the first constant rotation control to the second constant rotation control in accompaniment with the return of the second switch 38 to the initial position.

When the first switch 37 is operated during execution of the second constant rotation control, the display information is transmitted to the display control means 71 in accompaniment with the pressing operation at that time, the first stored rotational speed ("1800," in this case) is continuously displayed on the liquid crystal display 30 in place of the second stored rotational speed ("1000," in this case), and the first identification symbol 40 is changed (see (B) and (A) of FIG. 4) from one that shows the second stored rotational speed ("B," in this case) to one that shows first stored rotational speed ("A," in this case). A transition is then made from the second constant rotation control to the first constant rotation control in accompaniment with the return of the first switch 37 to the initial position.

In other words, the post-transition target rotational speed in the first constant rotation control or the second constant rotation control can be displayed on the liquid crystal display 30 and visually presented to the driver at a stage prior to the output speed of the engine 1 being changed in accompaniment with transition from the first constant rotation control to the second constant rotation control or from the second constant rotation control to the first constant rotation control.

The engine speed control means 50 carries out foot accelerator control with priority given to the first constant rotation control when the pedal-set rotational speed becomes greater than the first stored rotational speed during execution of the first constant rotation control, transmits display information to the display control means 71, and changes display of the second identification symbol 41 ("AUTO," in this case) from a continuous display to an intermittent display (see (A) and (F) of FIG. 4).

When the pedal-set rotational speed becomes less than the first stored rotational speed during priority execution of the foot accelerator control, the foot accelerator control is ended, the first constant rotation control is restarted, the display information is transmitted to the display control means 71, and display of the second identification symbol 41 ("AUTO," in this case) on the liquid crystal display 30 is changed from an intermittent display to a continuous display (see (F) and (A) of FIG. 4).

When the pedal-set rotational speed becomes greater than the second stored rotational speed during execution of the second constant rotation control, the foot accelerator control is carried out with priority given to the second constant rotation control, the display information is transmitted to the display control means 71, and display of the second identification symbol 41 ("AUTO," in this case) on the liquid crystal display 30 is changed from a continuous display to an intermittent display (see (B) and (G) of FIG. 4).

When the pedal-set rotational speed becomes less than the second stored rotational speed during priority execution of the foot accelerator control, the foot accelerator control is ended, the second constant rotation control is restarted, the display information is transmitted to the display control means 71, and display of the second identification symbol 41 ("AUTO," in this case) on the liquid crystal display 30 is changed from an intermittent display to a continuous display (see (G) and (B) of FIG. 4).

In other words, in the case that a transition is made from the first constant rotation control or the second constant rotation control to the foot accelerator control by operating the accelerator pedal 31 during execution of the first constant rotation control or the second constant rotation control, the second identification symbol 41 is intermittently displayed while the first stored rotational speed or the second stored rotational speed, as well as the first identification symbol 40 that indicates the stored rotational speed, are continuously displayed on the liquid crystal monitor 30, whereby the transition from the first constant rotation control or the second constant rotation control to the foot accelerator control can be visually presented to the driver. Also, in the case that the first constant rotation control or the second constant rotation control is to be restarted by operating the accelerator pedal 31 during priority execution of the foot accelerator control, the first stored rotational speed or the second stored rotational speed, as well as the first identification symbol 40 and the second identification symbol 41 that correspond to the stored rotational speed, are continuously displayed on the liquid crystal display 30, whereby the driver can be made visually aware of the restart of the first constant rotation control or the second constant rotation control, and of the target rotational speed in the restarted first constant rotation control or second constant rotation control.

The engine speed following transition to the foot accelerator control can be visually presented using a tachometer.

When the upper limit rotational speed becomes less than the first stored rotational speed during execution of the first constant rotation control, the engine speed control means 50 carries out the upper limit rotation control with priority given to the first constant rotation control, transmits the display information to the display control means 71, continuously displays on the liquid crystal display 30 the upper limit rotational speed ("1700" is shown as an example in this case) in place of the first stored rotational speed ("1800," in this case), changes the first identification symbol 40 from one ("A," in this case) showing the first stored rotational speed to one ("L," in this case) showing the upper limit rotational speed, and changes the second identification symbol 41 from one ("AUTO," in this case) showing the execution of the first constant rotation control or the second constant rotation control to one ("↑AUTO," in this case) showing the priority execution of the upper limit rotation control (see (A) and (H) of FIG. 4).

When the upper limit rotational speed becomes greater than the first stored rotational speed during priority execution of the upper limit rotation control, the upper limit rotation control is ended, the first constant rotation control is restarted, the display information is transmitted to the display control means 71, the first stored rotational speed ("1800," in this case) is continuously displayed on the liquid crystal display 30 in place of the upper limit rotational speed ("1700," in this case), the first identification symbol 40 is changed from one ("L," in this case) showing the upper limit rotational control to one ("A," in this case) showing the first stored rotational speed, and the second identification symbol 41 is changed from one ("↑AUTO," in this case) showing the priority execution of the upper limit rotation control to one ("AUTO," in this case) showing the execution of the first constant rotation control or the second constant rotation control (see (H) and (A) of FIG. 4).

When the upper limit rotational speed becomes less than the second stored rotational speed during execution of the second constant rotation control, the upper limit rotation control is carried out with priority given to the second constant rotation control, the display information is transmitted to the display control means 71, the upper limit rotational speed ("900" is shown as an example in this case) is continuously displayed on the liquid crystal display 30 in place of the second stored rotational speed ("1000," in this case), the first identification symbol 40 is changed from one ("B," in this case) showing the second stored rotational speed to one ("L," in this case) showing the upper limit rotational speed, and the second identification symbol 41 is changed from one ("AUTO," in this case) showing the execution of the first constant rotation control or the second constant rotation control to one ("↑AUTO," in this case) showing the priority execution of the upper limit rotation control (see (B) and (I) of FIG. 4).

When the upper limit rotational speed becomes greater than the second stored rotational speed during priority execution of the upper limit rotation control, the upper limit rotation control is ended, the second constant rotation control is restarted, the display information is transmitted to the display control means 71, the second stored rotational speed ("1000," in this case) is continuously displayed on the liquid crystal display 30 in place of the upper limit rotational speed ("900," in this case), the first identification symbol 40 is changed from one ("L," in this case) showing the upper limit rotational control to one ("B," in this case) showing the second stored rotational speed, and the second identification symbol 41 is changed from one ("↑AUTO," in this case) showing the priority execution of the upper limit rotation control to one ("AUTO," in this case) showing the execution of the first constant rotation control or the second constant rotation control (see (I) and (B) of FIG. 4).

In other words, the upper limit rotational speed, the first identification symbol 40 showing the upper limit rotational speed, and the second identification symbol 41 showing the priority execution of the upper limit rotation control are continuously displayed on the liquid crystal display 30 in the case that a transition is made from the first constant rotation control or the second constant rotation control to the upper limit rotation control by operating the upper-limit setting device 35 during execution of the first constant rotation control or the second constant rotation control, whereby the driver can be made visually aware of the transition to the upper limit rotation control and the output speed of the engine 1 at that time.

Also, the first stored rotational speed or the second stored rotational speed, the first identification symbol 40 showing the stored rotational speed, and the second identification symbol 41 showing the execution of the first constant rotation control or the second constant rotation control are continuously displayed in the case that the first constant rotation control or the second constant rotation control is restarted by operating the upper-limit setting device 35 during priority execution of the upper limit rotation control, whereby the driver can be made visually aware of the restart of the first constant rotation control or the second constant rotation control, and of the target rotational speed in the restarted first constant rotation control or the second constant rotation control.

When the first switch 37 is operated in the case that the upper limit rotational speed is less than the first stored rotational speed or in the case that the pedal-set rotational speed is greater than the first stored rotational speed, the engine speed control means 50 transmits the display information to the display control means 71 in accompaniment with the operation, intermittently displays the first stored rotational speed ("1800," in this case) on the liquid crystal display 30, and continuously displays (see (J) of FIG. 4) the first identification symbol 40 ("A," in this case) and the second identification symbol 41 ("AUTO," in this case).

When the second switch 38 is operated in the case that the upper limit rotational speed is less than the second stored rotational speed or in the case that the pedal-set rotational speed is greater than the second stored rotational speed, the display information is transmitted to the display control means 71 in accompaniment with the operation, the second stored rotational speed ("1000," in this case) is intermittently displayed on the liquid crystal display 30, and the first identification symbol 40 ("B," in this case) and the second identification symbol 41 ("AUTO," in this case) are continuously displayed (see (K) of FIG. 4) on the display.

The driver can be visually made aware of the fact that the first constant rotation control or the second constant rotation control are not being carried out regardless of the operation of the first switch 37 or the second switch 38 because of the operative position of the accelerator pedal 31 or the upper-limit setting device 35.

When the first switch 37 is pressed for a long period during execution of the first constant rotation control, the engine speed control means 50 makes a transition from the first constant rotation control to the first stored rotational speed variation control, transmits the display information to the display control means 71, and changes the display of the first identification symbol 40 ("A," in this case) and the second identification symbol 41 ("AUTO," in this case) from a continuous display to an intermittent display on the liquid crystal display 30 (see (A) and (L) of FIG. 4).

When the second switch 38 is pressed for a long period during execution of the second constant rotation control, a transition is made from the second constant rotation control to the second stored rotational speed variation control, the display information is transmitted to the display control means 71, and the display of the first identification symbol 40 ("B," in this case) and the second identification symbol 41 ("AUTO," in this case) is changed from continuous display to intermittent display on the liquid crystal display 30 (see (B) and (M) of FIG. 4).

A transition can thereby be made from the first constant rotation control or the second constant rotation control to the first stored rotational speed or the second stored rotational speed, and the driver can be visually presented with the fact that the setting of the first stored rotational speed or the second stored rotational speed can be changed by operating the first switch 37 or the second switch 38.

When the first switch 37 or the second switch 38 is operated during execution of the first stored rotational speed variation control or the second stored rotational speed variation control, the engine speed control means 50 modifies the first stored rotational speed or the second stored rotational speed, transmits the display information to the display control means 71, and continuously displays the first stored rotational speed or the second stored rotational speed on the liquid crystal display 30 following the modification. The modification of the setting of the first stored rotational speed or the second stored rotational speed can be carried out while viewing the modification by operating the first switch 37 or the second switch 38.

When a display switch 42 disposed in the passenger/driver section 8 is operated, the engine speed control means 50 transmits the display information to the display control means 71, and the information displayed on the liquid crystal display 30 is switched in each setting period (e.g., one second) between, first, a state in which the first stored rotational speed ("1800," in this case), the first identification symbol 40 ("A," in this case), and the second identification symbol 41 ("AUTO," in this case) are continuously displayed, and, second, a state in which the second stored rotational speed ("1000," in this case), the first identification symbol 40 ("B," in this case), and the second identification symbol 41 ("AUTO," in this case) are continuously displayed.

Various control programs, map data, the first stored rotational speed, second stored rotational speed, and the like are stored in storage means 21D composed of an EEPROM, flash memory, or another non-volatile memory provided to the controller 21.

Next, an example of the basic control flow of the engine speed control according to the present invention will be described with reference to the flowchart shown in FIG. 5.

Figure 5:
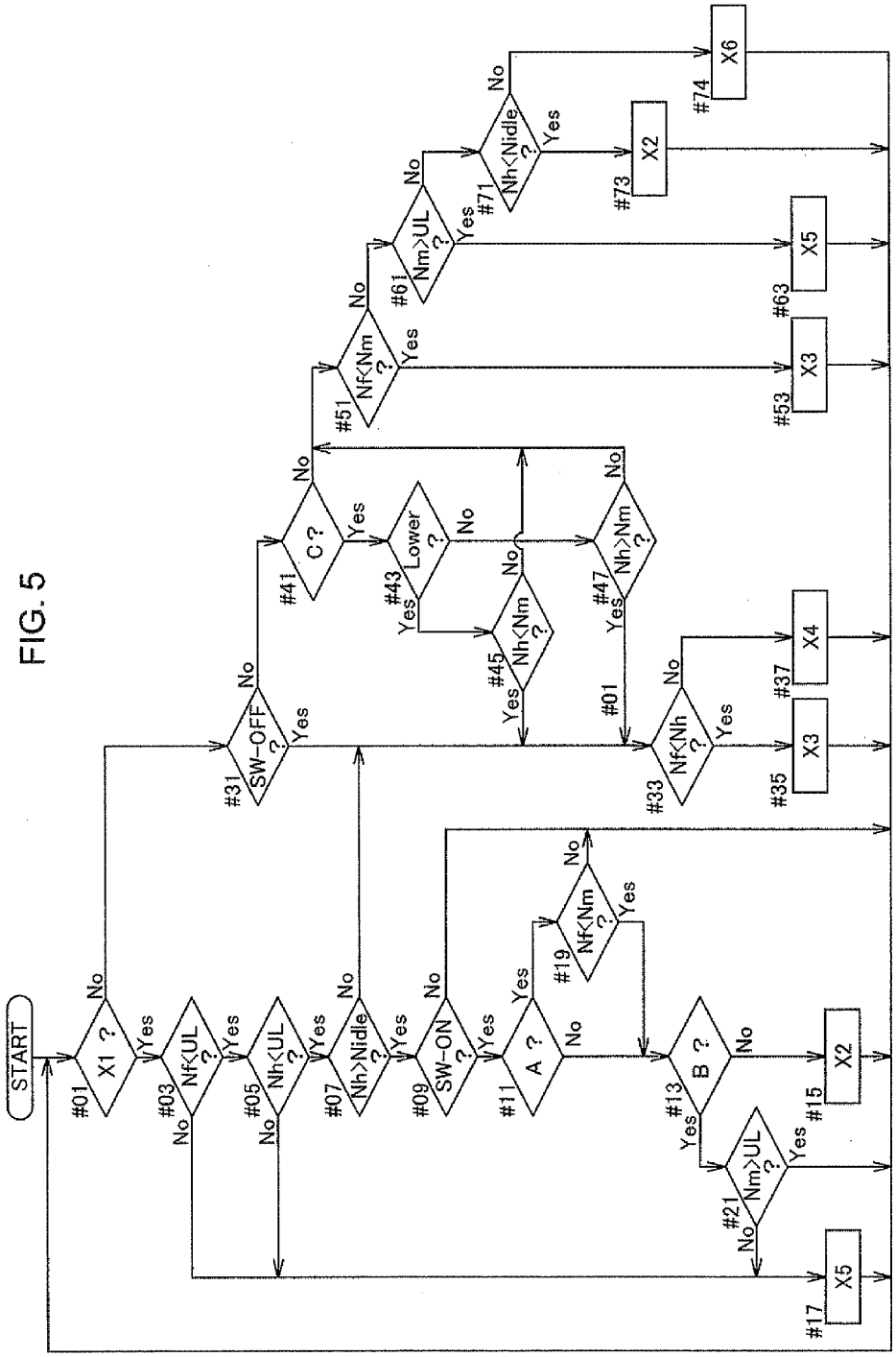
FIG. 5 is a flowchart showing an example of control in the engine speed control system.

In FIG. 5, Nf is the engine speed based on the operative position of the accelerator pedal 31, Nh is the engine speed based on the operative position of the accelerator lever 33, Nm is the stored engine speed that is read by the switch 37, Nidle is the idling speed, and UL is the upper limit engine speed that is set by the upper-limit setting device 35.

The descriptive content substituted with symbols in the diagram follows.

A: Is priority foot accelerator control being carried out?
B: Is priority upper limit rotation control being carried out?
C: Has the accelerator lever 33 been operated?
X1: Is constant rotation control being carried out?
X2: Execute constant rotation control
X3: Execute foot accelerator control
X4: Execute hand accelerator control
X5: Execute upper limit rotation control
X6: Terminate constant rotation control First, it is determined whether constant rotation control is being carried out (#01). In the case that the constant rotation control is being carried out (branch to Yes in #01), a comparison (#03) is made between the engine speed Nf based on the operative position of the accelerator pedal 31 and the upper limit engine speed UL set by the upper-limit setting device 35. If Nf<UL (branch to Yes in #03), a comparison (#05) is made between the engine speed Nh based on the operative position of the accelerator lever 33 and the upper limit engine speed UL set by the upper-limit setting device 35. If Nh<UL (branch to Yes in #05), a comparison (#07) is made between the engine speed Nh based on the operative position of the accelerator lever 33 and the idling speed Nidle. If Nh>Nidle (branch to Yes in #07), it is determined whether the switch 37 is on (#09).

If the switch 37 is on (branch to Yes in #09), it is determined whether priority foot accelerator control is being carried out (#11). If the priority foot accelerator control is not being carried out (branch to No in #11), it is determined whether the priority upper limit rotation control is being carried out (#13). If the priority upper limit rotation control is not being carried out (branch to No in #13), the constant rotation control is carried out (#15) by the constant rotation controller 53 and the process returns again to step #01.

If Nf<UL does not hold true (branch to No in #03)) in the determination of step #03, or if Nh<UL does not hold true (branch to No in #05) in the determination of step #05, the upper limit rotation control is carried out (#17) by an upper limit rotation controller 54, and the process returns again to step #01. When the priority foot accelerator control is being carried out in the determination of step #11 (branch to Yes in #11), a comparison (#19) is made between the engine speed Nf based on the operative position of the accelerator pedal 31 and the stored engine speed Nm that is read by the switch 37. If Nf<Nm (branch to Yes in #19) in step #19, the process moves to step #13; and if Nf<Nm does not hold true (branch to Yes in #19), the process returns directly to step #01. When the priority upper limit rotation control is being carried out in the determination of step #13 (branch to Yes in #13), a comparison (#21) is made between the stored engine speed Nm that is read by the first switch 37 and the upper limit engine speed UL; and when the upper limit engine speed UL becomes less than the stored engine speed Nm, i.e., when Nm>UL does not hold true (branch to No is #21), the process moves to step #17 and the upper limit rotation control is carried out. If Nm>UL holds true (branch to Yes in #21), the process returns directly to step #01.

When the constant rotation control is not being carried out (branch to No is #01) in the determination of step #01, it is determined (#31) whether the switch 37 is off. If the switch 37 is off (branch to Yes in #09), a comparison is made (#33) between the engine speed Nf based on the operative position of the accelerator pedal 31 and the engine speed Nh based on the operative position of the accelerator lever 33. If Nf<Nh (branch to Yes in #33), the foot accelerator control is carried out by the foot accelerator controller 51 (#35). If Nf<Nh does not hold true (branch to No in #33), the hand accelerator control is carried out by the hand accelerator controller 52 (#37). The process then returns to step #01.

When the switch 37 is not off (branch to No in #31) in the determination of step #31, it is determined (#41) whether the accelerator lever 33 has been operated. When the accelerator lever 33 has been operated (branch to Yes in #41) in the determination of step #41, it is determined (#43) whether the operation is in the direction of reducing the engine rotations or in the direction of increasing the engine rotations. When the accelerator lever 33 is operated in the deceleration direction (branch to Yes in #43), a comparison (#45) is made between the engine speed Nh based on the operative position of the accelerator lever 33 and the stored engine speed Nm that is read by the switch 37. When the accelerator lever 33 is operated in the acceleration direction (branch to No in #43), a comparison (#47) is similarly made between Nh and Nm. If Nh<Nm holds true in step #45 (branch to Yes in #45), the process moves to step #33 described above. Also, if Nh>Nm holds true in step #47 (branch to Yes in #47), the process moves to step #33 described above.

The following cases may be encountered: the accelerator lever 33 is not being operated in step #41 (branch to No in #41), Nh<Nm does not hold true in step #45 (branch to No in #45), or Nh>Nm does not hold true in step #47 (branch to No in #47). In any of these cases, a comparison (#51) is subsequently made between the engine speed Nf based on the operative position of the accelerator pedal 31 and the stored engine speed Nm that is read by the switch 37.

In step #51, if Nf<Nm holds true (branch to Yes in #51), the foot accelerator control is carried out (#53) by the foot accelerator controller 51, and the process returns to step #01. In step #51, if Nf<Nm does not hold true (branch to No in #51), a comparison (#61) is made between the stored engine speed Nm that is read by the first switch 37 and the upper limit engine speed UL. Here, when the upper limit engine speed UL is less than the stored engine speed Nm, i.e., when Nm>UL holds true (branch to Yes in #61), the upper limit rotation control is carried out (#63), and the process returns to step #01. If Nm>Ul holds true (branch to No in #61), a comparison (#71) is made between the engine speed Nh based on the operative position of the accelerator lever 33 and the idling speed Nidle. Here, if Nh<Nidle holds true (branch to Yes in #71), the constant rotation control is carried out by the constant rotation controller 53 (#73), and the process returns to step #01. If Nh<Nidle does not hold (branch to No in #71), the constant rotation control carried out by the constant rotation controller 53 is terminated (#74) and the process returns to step #01.

The functions of the display control means 71 will be listed below.

(1)

The engine speed that is read from the storage means 56 on the basis of the operation of the input device is displayed on the liquid crystal display 30, and the constant rotation control is started after completion of the display process. The stored rotational speed can be visually confirmed via the liquid crystal monitor 30 from a stage that precedes one in which the output speed of the engine is changed by the constant rotation control.

(2)

The engine speed that corresponds to the output of the pedal sensor 32 or the lever sensor 34 is displayed on the liquid crystal display 30 before accelerator control is started. The engine speed that corresponds to the output of a rotation sensor 27, which is the target of accelerator control, can thereby be visually confirmed via the liquid crystal monitor 30 from a stage prior to transitioning from constant rotation control to accelerator control.

(3)

When the upper limit rotational speed becomes greater than the engine speed stored in the storage means 56 during priority execution of the upper limit rotation control, the engine speed stored in the storage means is displayed on the liquid crystal monitor 30. Thereafter, the upper limit rotation control is ended and the constant rotation control is restarted.

(4)

When the engine speed stored in the storage means 56 is changed, the engine speed after the changed is displayed on the liquid crystal monitor 30.

(5)

The engine speed that is read from the storage means 56 is displayed on the liquid crystal monitor 30 on the basis of a pressing operation of the momentary switch (first switch 37 and second switch 38). Constant rotation control is started based on the return of the momentary switch to the initial position.

(6)

The engine speed that corresponds to one of the pressed momentary switches is read from the storage means 56, and the engine speed thus read is displayed on the liquid crystal monitor 30, as is the identification symbol showing that the engine speed is corresponds to the [pressed] momentary switch. Based on the return of one of the momentary switches to the initial position, the constant rotation control is started by using as the control target the engine speed that corresponds to one of the momentary switches. Two types of engine speed can thereby be selected when the constant rotation control is started, and the selected engine speed can be visually confirmed via the liquid crystal monitor 30 at a stage prior to the start of the constant rotation control.

(7)

The engine speed stored in the storage means 56 on the basis of the operation of the momentary switch is varied and the engine speed after the change is displayed on the liquid crystal monitor 30.

Other Embodiments

[1] The work vehicle may be a riding-type mower vehicle, a riding-type rice-transplanting vehicle, a combine, a wheel dozer, or the like.

[2] The implement mounted on the tractor may be a front loader, a grooving device, a ridge-plastering device, or the like.

[3] The engine 1 may be a diesel engine or a gasoline engine.

[4] The fuel injection control means 16A and the controller 21 may be integrally configured.

[5] The switches 37 and 38 may be configured using a neutral return-type single switch provided with first and second contact points.

[6] A single stored rotational speed may be stored, or three or more stored rotational speeds may be stored in the storage means 56.

[7] In the case that the operation of the accelerator lever 33 in the direction in which the engine speed is reduced during execution of the first constant rotation control is detected by the lever sensor 34, and the lever-set rotational speed after the operation becomes less than the first stored rotational speed, the engine speed control means 50 ends the first constant rotation control, selects the accelerator control having a higher engine speed as the control target from among the foot accelerator control and the hand accelerator control, and carries out this control. In the case that the operation of the accelerator lever 33 in the direction in which the engine speed is reduced during execution of the second constant rotation control is detected by the lever sensor 34, and the lever-set rotational speed after the operation becomes less than the second stored rotational speed, the engine speed control means 50 ends the second constant rotation control, selects the accelerator control having a higher engine speed as the control target from among the foot accelerator control and the hand accelerator control, and carries out this control.

What is claimed is:

1. An engine speed control system for a work vehicle, comprising:
    a pedal sensor for detecting an operative position of an accelerator pedal;
    a foot accelerator controller for carrying out foot accelerator control in which the engine speed that corresponds to an output of the pedal sensor is used as a target rotational speed;
    a lever sensor for detecting the operative position of an accelerator lever;
    a hand accelerator controller for carrying out hand accelerator control in which the engine speed that corresponds to an output of the lever sensor is used as the target rotational speed;
    a manually operated input device;
    storage means for storing a predetermined engine speed; and
    a constant rotation controller for carrying out constant rotation control in which the engine speed stored in the storage means is used as the target rotational speed on the basis of an input to the input device, wherein
    the constant rotation control is carried out when the input device has been operated in the case that the engine speed that corresponds to the output of the lever sensor is greater than an idling speed; and
    the constant rotation control is terminated when the input device is operated in the case that the engine speed that corresponds to the output of the lever sensor is equal to or less than the idling speed.

2. The engine speed control system of claim 1, wherein the constant rotation control being carried out is terminated and accelerator control having a higher target engine speed among the foot accelerator control and the hand accelerator control is carried out on the basis of the operation of the input device when the operation is carried out during execution of the constant rotation control.

3. The engine speed control system of claim 1, wherein:
    the foot accelerator control is carried out with priority given to the constant rotation control when the engine speed that corresponds to the output of the pedal sensor during execution of the constant rotation control is greater than the engine speed stored in the storage means; and
    the foot accelerator control is terminated and the constant rotation control is resumed when the engine speed that corresponds to the output of the pedal sensor is less than the engine speed stored in the storage means during priority execution of the foot accelerator control.

4. The engine speed control system of claim 1, wherein the constant rotation control is terminated and accelerator control having a higher target engine speed among the foot accelerator control and the hand accelerator control is carried out in the case that the accelerator lever operation is detected in the direction in which the target engine speed is reduced during execution of the constant rotation control, and that the target engine speed based on the accelerator lever operation is less than the engine speed stored in the storage means.

5. The engine speed control system of claim 1, wherein the constant rotation control is terminated in the case of detecting an operation of the accelerator lever in which the target engine speed during execution of the constant rotation control becomes equal to or less than the idling speed.

6. The engine speed control system of claim 1, wherein the constant rotation control is terminated and accelerator control having a higher target engine speed among the foot accelerator control and the hand accelerator control is carried out in the case that the accelerator lever operation is detected in the direction in which the target engine speed is increased during execution of the constant rotation control, and that the target engine speed based on the accelerator lever operation is greater than the engine speed stored in the storage means.

7. The engine speed control system of claim 1, further comprising:
    upper limit setting means for setting an upper limit of an engine speed; and
    an upper limit rotation controller for carrying out upper limit rotation control to limit the target engine speed to an upper limit rotational speed set by the upper limit setting means, wherein
    the upper limit rotation control is carried out with priority given to the constant rotation control when the upper limit rotational speed set by the upper limit setting means during execution of the constant rotation control is less than the engine speed stored in the storage means; and the upper limit rotation control is terminated and the constant rotation control is carried out again when the upper limit rotational speed becomes greater than the engine speed stored in the storage means during priority execution of the upper limit rotation control.

8. The engine speed control system of claim 1, further comprising:

upper limit setting means for setting an upper limit of an engine speed; and an upper limit rotation controller for carrying out upper limit rotation control to limit the target engine speed to an upper limit rotational speed set by the upper limit setting means, wherein the constant rotation control is terminated when the upper limit rotational speed set by the upper limit setting means during execution of the constant rotation control is less than the engine speed stored in the storage means;

accelerator control having a higher target engine speed among the foot accelerator control and the hand accelerator control is executed in the case that both the target engine speed based on the pedal sensor and the target engine speed based on the lever sensor at the time of termination of the constant rotation control are less than the upper limit rotational speed; and the upper limit rotation control is carried out in the case that one speed among the target engine speed based on the pedal sensor and the target engine speed based on the lever sensor at the time of termination of the constant rotation control is higher than the upper limit rotational speed.

9. The engine speed control system of claim 1, wherein two types of engine speeds that can be selected by operating the input device are stored in the storage means, and the selected engine speed is used as the target engine speed in the constant rotation control.

10. The engine speed control system of claim 9, wherein a momentary switch for enabling selection of one of the engine speeds, and a momentary switch for enabling selection of the other of the engine speeds are provided as the input device.

11. The engine speed control system of claim 2, wherein engine speed control is carried out at a variable speed that is less than the variable speed of reduction of the engine output rotational speed based on the operation of the input device in the case that the output speed of the engine increases due to termination of the constant rotation control.

12. The engine speed control system of claim 1, further comprising:

display control means for switchably displaying various information, wherein the engine speed that is read from the storage means on the basis of an input to the input device is displayed on a display device, and the constant rotation control is carried out after the engine speed has been displayed.

* * * * *